US008161180B1

(12) United States Patent
Swift et al.

(10) Patent No.: US 8,161,180 B1
(45) Date of Patent: Apr. 17, 2012

(54) METHOD AND APPARATUS FOR ROUTING A DATA STREAM THROUGH A PLURALITY OF DATA MOVERS INDEPENDENT OF A NETWORK INTERFACE TYPE

(75) Inventors: Jeremy Dean Swift, Plymouth, MN (US); Stephan Kurt Gipp, Inver Grove Heights, MN (US); Adonijah Park, Forest Lake, MN (US)

(73) Assignee: Symantec Corporation, Mountain View, CA (US)

( * ) Notice: Subject to any disclaimer, the term of this patent is extended or adjusted under 35 U.S.C. 154(b) by 133 days.

(21) Appl. No.: 12/338,116

(22) Filed: Dec. 18, 2008

(51) Int. Cl.
*G06F 15/16* (2006.01)

(52) U.S. Cl. ........ 709/232; 709/233; 709/240; 709/241; 370/389; 370/432

(58) Field of Classification Search .................. 709/231, 709/232, 240, 241; 370/389, 432
See application file for complete search history.

(56) References Cited

U.S. PATENT DOCUMENTS

| | | | | |
|---|---|---|---|---|
| 6,507,586 | B1 * | 1/2003 | Satran et al. | 370/432 |
| 2006/0218166 | A1 * | 9/2006 | Myers et al. | 707/100 |
| 2008/0151881 | A1 * | 6/2008 | Liu et al. | 370/389 |

* cited by examiner

*Primary Examiner* — Yves Dalencourt
(74) *Attorney, Agent, or Firm* — Campbell Stephenson LLP

(57) ABSTRACT

A method and apparatus for routing a data stream through a plurality of data movers independent of a network interface type is provided. In one embodiment, the method for routing the data stream to a destination with indifference to network interface type includes segregating the data stream into a plurality of data blocks at an application layer, wherein the plurality of data blocks are to be routed to a destination through the plurality of data movers and coordinating data path selection for communicating the plurality of data blocks to the plurality of data movers over a plurality of data paths.

15 Claims, 4 Drawing Sheets

300

200

400

METHOD AND APPARATUS FOR ROUTING A DATA STREAM THROUGH A PLURALITY OF DATA MOVERS INDEPENDENT OF A NETWORK INTERFACE TYPE

BACKGROUND

1. Field of the Invention

Embodiments of the present invention generally relate to backup techniques and, more particularly, to a method and apparatus for routing a data stream through a plurality of data movers independent of a network interface type to optimize load balancing.

2. Description of the Related Art

In a typical computing environment, small to large sized organizations utilize various technologies, such as a data storage system, to store and protect mission critical data. The data storage system, generally, includes a plurality of data movers and an array of physical disk drives (e.g., ATA disks, Fibre channel disks, a magnetic tape library and any other data storage device) that facilitate data backup and/or restoration. A data mover, in any type of the data storage system, refers to the function (e.g., a process) that is able to push or pull (e.g., send or receive, respectively) data over a plurality of data paths between various computing environments (e.g., various platforms, protocols, systems and the like).

The data movers, generally, include data transfer systems, devices and/or software that utilize the capabilities of the data storage system (e.g., data backup, duplication and/or restoration processes) to quickly and reliably route the mission critical data from one location (e.g., a client computer, a database and the like) to another location (e.g., tape library, disk drives and the like) through a network interface. For example, a data movers may read the mission critical data from one data storage device and then, transfer the mission critical data to another data storage device.

The mission critical data may be lost and/or corrupted due to various system failures or a virus attack. As such, the mission critical data may be backed up on a regular basis (e.g., continuously) to the one or more storage devices (e.g., a tape drive, a hard disk drive and/or the like). In conventional backup techniques, the mission critical data is routed through a single network interface or data path. In other words, each data block of the mission critical data is transmitted over the same data path regardless of an input/output (I/O) load and/or another better performing data path. Consequently, the single data path is congested and becomes a bottleneck for routing the mission critical data from a computer to the one or more storage devices.

There are one or more technologies that leverage two data paths to communicate a data stream between the client and a single data mover for a backup process. Such technologies, however, operate at a network layer (e.g., the network layer of Open System Interconnection (OSI) or Internet layer of TCP/IP). If the single data mover fails during transmission, the data stream is lost. Furthermore, the backup process also fails and must be restarted. Additionally, if any of the two data paths fail during transmission, the data stream is also lost if the backup process cannot be failed over to the other data path and/or cannot be retried. For example, the backup process may employ a data transmission protocol that does not permit retries after such a failure.

Unfortunately, error recovery solutions are limited to coarse-grain checkpoint restart mechanisms, which locate a point-in-time at which the backup process was interrupted and restarts the backup process from that point-in-time. Moreover, such technologies cannot enable fine granularity for the error recovery solutions if the data stream is sent as a completely separate archiving (.TAR) file. As a result, the conventional backup techniques are unable to provide a reliable and efficient backup of the data stream over multiple data paths and suffer from network bandwidth and throughput constraints.

Therefore, there is a need in the art for a method and apparatus for routing a data stream through a plurality of data movers over a plurality of data paths independent of a network interface type to optimize load balancing.

SUMMARY OF THE INVENTION

Embodiments of the present invention comprise a method and apparatus for routing a data stream through a plurality of data movers independent of a network interface type. In one embodiment, a method for routing a data stream to a destination through a plurality of data movers with indifference to network interface type includes segregating the data stream into a plurality of data blocks at an application layer, wherein the plurality of data blocks are to be routed to a destination through the plurality of data movers and coordinating data path selection for communicating the plurality of data blocks to the plurality of data movers over a plurality of data paths.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
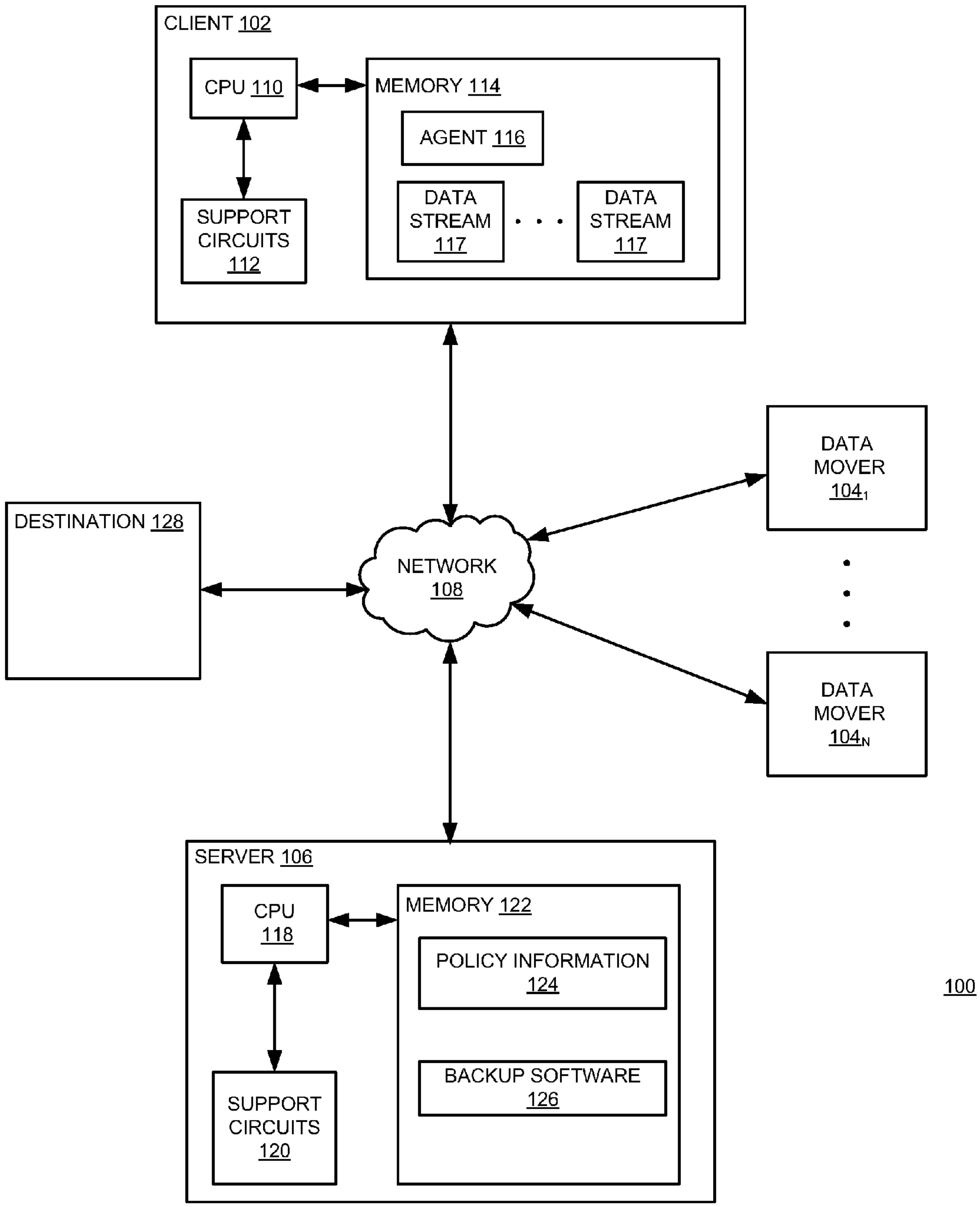
FIG. 1 is a block diagram of a system for routing a data stream to a destination through a plurality of data movers with indifference to network interface type according to one or more embodiments.

FIG. 1 is a block diagram of a system 100 for routing a data stream to a destination through a plurality of data movers with indifference to network interface type according to one or more embodiments of the present invention. In one embodiment, the system 100 comprises a client 102, a plurality of data movers 104, a server 106 and a destination 128 where each is coupled to the other through a network 108.

The client 102 is a type of computing device (e.g., a laptop, a desktop, a Personal Digital Assistant (PDA), a mobile phone and/or the like), such as those generally known in the art. The client 102 includes a Central Processing Unit (CPU) 110, various support circuits 112 and a memory 114. The CPU 110 may comprise one or more commercially available microprocessors or microcontrollers that facilitate data processing and storage. The various support circuits 112 facilitate the operation of the CPU 110 and include one or more clock circuits, power supplies, cache, input/output circuits and the like. The memory 114 comprises at least one of Read Only Memory (ROM), Random Access Memory (RAM), disk drive storage, optical storage, removable storage and the like. The memory 114 includes various software packages, such as an agent 116. The memory 114 further includes various data, such as a data stream 117.

The plurality of data movers 104 are illustrated as a data mover $\mathbf{104}_1$ . . . a data mover $\mathbf{104}_n$. Generally, the data movers 104 include processes that serve as an interface between the client 102 and the destination 128. In one embodiment, the data movers 104 are abstract machines running on one or more computing devices. For example, the data movers 104 may be instances of middleware (e.g., software comprising a collection of algorithms for communicating data for a variety of applications, such as data backup, recovery and duplication tasks) executed by the one or more computing devices (e.g., a media server). In another embodiment, the data movers 104 are physical devices with embedded software for routing the data stream 117 to the destination 128. In operation, the data movers 104 receives the plurality of data blocks that form the data stream 117 from the client 102 through the network 108 in accordance with various communication protocols. The data stream 117 may be communicated to the data movers 104 via various application layer protocols, such as File Transfer Protocol (FTP), Network File System (NFS), Common Internet File System (CIFS) and/or the like.

The server 106 is a type of computing device (e.g., a laptop, a desktop, a Personal Digital Assistant (PDA), a mobile phone and/or the like), such as those generally known in the art. The server 106 includes a Central Processing Unit (CPU) 118, various support circuits 120 and a memory 122. The CPU 118 may comprise one or more commercially available microprocessors or microcontrollers that facilitate data processing and storage. The support circuits 120 facilitate the operation of the CPU 118 and include one or more clock circuits, power supplies, cache, input/output circuits and the like. The memory 122 comprises at least one of Read Only Memory (ROM), Random Access Memory (RAM), disk drive storage, optical storage, removable storage and the like. The memory 122 includes various software packages, such as backup software 126. The memory 112 further includes various data, such as policy information 124.

The network 108 comprises a communication system that connects computers by wire, cable, fiber optic and/or wireless link facilitated by various types of well-known network elements, such as hubs, switches, routers and the like. The network 108 may employ various well-known protocols to communicate information amongst the network resources. For example, the network 108 may be a part of the Internet or intranet using various communications infrastructure, such as Ethernet, WiFi, WiMax, General Packet Radio Service (GPRS) and the like. Furthermore, the network 106 may form a portion of a Storage Network Area (SAN) using various communications infrastructure such as Ethernet, Fibre Channel, InfiniBand, SCSI (Small Computer System Interface) and/or the like.

According to various embodiments, the agent 116 includes software code that is configured to segregate the data stream 117 into a plurality of data blocks at an application layer. For example, the application layer of a networking architecture, such as TCP/IP, provides one or more application-level network services. In one embodiment, the agent 116 coordinates data path selection for communicating the plurality of data blocks to the data movers 104 over the plurality of data paths. The agent 116 communicates the plurality of data blocks over a plurality of data paths to one or more data movers of the data movers 104. In one embodiment, the agent 116 selects a data path of the plurality of data paths in accordance with the policy information 124. For example, the agent 116 may select a data path to a data mover having a lowest Input/Output (I/O) load. In another embodiment, the agent 116 assigns a number to each data block of the plurality of data blocks. For example, each number may correspond with a position in the data stream 117.

In one embodiment, the data blocks are asynchronously reassembled at a destination 128 volume regardless of how the data blocks are received at the one or more data movers of the data movers 104. In one embodiment, the agent 116 identifies one or more data blocks of the data blocks that are not present at the destination 128. For example, if the agent 116 receives a transmission error associated with a data path, then the one or more data blocks were not transmitted correctly over the data path or received at the destination 128. In response, the agent 116 resends the identified one or more data block through another data path of the plurality of data paths.

According to various embodiments, the policy information 124 defines one or more restrictions to data path selection by the agent 116. For example, the policy information 124 may indicate that the agent 116 may not select a data path having a particular load. In another embodiment, the policy information 124 may permit the agent 116 an unrestricted use of the plurality of data paths in order to route the data blocks to the destination 128. In one embodiment, the policy information 124 defines one or more load balancing techniques for the data path selection, such as round robin, next available path, weight-based decision and/or the like. For example, the policy information 124 may assign a plurality of user-defined weights to the plurality of data paths in which the agent 116 selects an available data path having a lowest weighted input/output load value (e.g., weighted average).

The backup software 126 may be enterprise backup software (e.g., SYMANTEC NetBackup products, SYMANTEC BackupExec products and/or the like). According to various embodiments, the backup software 126 is designed to facilitate storage (i.e., a backup) of various client data. The backup software 126 cooperates with the agent 116 to create a backup (e.g., an image) of the various client data in the form of the data stream 117. For example, the data stream 117 may include a volume-level backup image that is routed to the destination 128.

The destination 128 generally includes one or more storage devices, such as sequential storage devices (i.e., magnetic tape drives), optical storage devices (e.g., hard disk drives, a disk array) and/or the like. In one embodiment, the data stream 117 may be routed to the destination 128 using various data transmission protocols, such as Ethernet using IP (Internet Protocol), iSCSI (Internet Small Computer System Interface) and/or the like. According to one or more embodiments, the data movers 104 store the data stream 117 in the destination 128. In one embodiment, the data movers 104 write each data block to appropriate locations in the destination 128. As an example, the data movers 104 may write a data block to a location that corresponds with a position (e.g., a number) amongst the data blocks that form the data stream 117. As such, the data stream 117 is reassembled at the destination 128 in a correct order.

Figure 2:
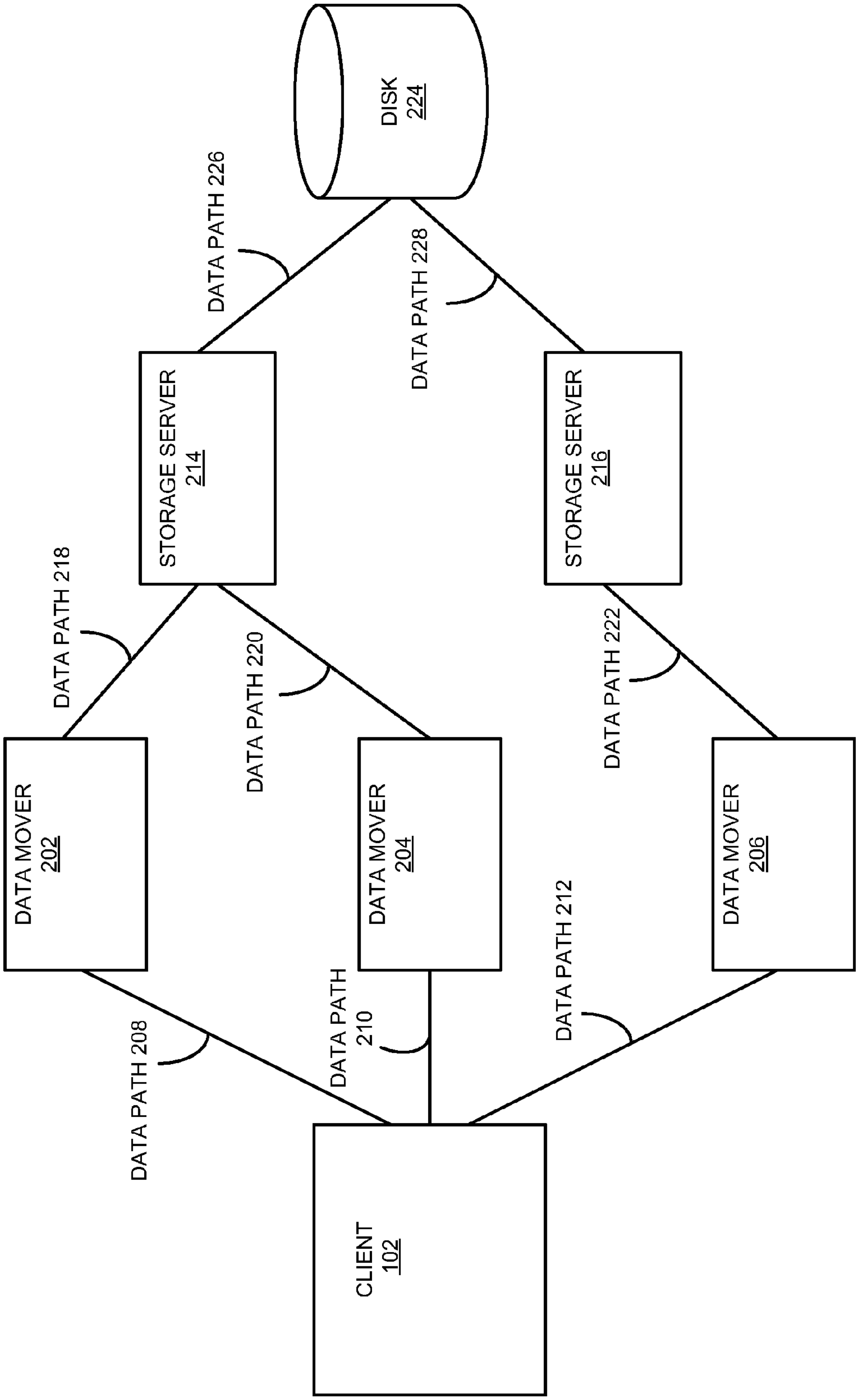
FIG. 2 is a functional block diagram that illustrates a multipath system for routing a data stream to a destination through a plurality of data movers with indifference to network interface type according to one or more embodiments.

FIG. 2 is a functional block diagram that illustrates a multipath system 200 for routing a data stream to a destination through a plurality of data movers with indifference to network interface type according to one or more embodiments of the present invention.

In one embodiment, the multi-path system 200 includes the client 102 that is coupled with a data mover 202 a data mover 204 and a data mover 206 through a data path 208, a data path 210 and a data path 212, respectively. The data mover 202 and the data mover 204 are coupled with a storage server 214 through a data path 218 and a data path 220, respectively. The data mover 204 is coupled with a storage server 216 through a data path 222. The storage server 214 and the storage server 216 are coupled with a disk 224 through a data path 226 and a data path 228, respectively.

The storage server 214 and the storage server 216 generally include various components (i.e., hardware and software) that are configured to manage storage resources (e.g., storage devices) within a data storage system. For example, the storage server 214 and the storage server 216 process write requests from the client 102 and write data to the disk 224 accordingly.

In operation, a data stream is segregated at the client 102 into a plurality of data blocks at an application-layer according to one or more embodiments. Because the plurality of data blocks is segregated at the application-layer, any network interface type may be used as a data path to a data mover. For example, a data block a plurality of data blocks may be communicated to the data mover 202 over Ethernet using IP (i.e., Internet Protocol) as the data path 208. Then, another data block a plurality of data blocks may be communicated to the data mover 204 over Fibre Channel using an SYMANTEC NetBackup SANClient implementation as the data path 210. Accordingly, the data mover 202 and the data mover 204 write the data block and the another data block to the disk 224 through the storage server 214. Even though the data path 208 differs from the data path 210, the data block and the another data block are assembled at the storage server 214 and written to appropriate locations at the disk 224.

Furthermore, the plurality of data blocks are numbered in an sequential order according to one or more embodiments. For example, a number for a particular data block corresponds with a position within the data stream. In addition, because each data block of the data stream is assigned a number, the plurality of data blocks may be reassembled at the disk 224 asynchronously. As such, the each data block is written to a location on the disk 224 that corresponds with the assigned number. In other words, the plurality of data blocks may be written to the disk 224 regardless of an order in which the plurality of data blocks arrive at the data mover 202, the data mover 204 and/or the data mover 206.

Additionally, in response to a transmission error, each and every lost data block may be resent over a different network interface as a data path. For example, if there is a transmission error at the data path 208, the data block of the plurality of data blocks is resent to the data mover 206 over iSCSI (Internet Small Computer System Interface) as the data path 212. Accordingly, the data mover 206 writes the data block to the disk 224 through the storage server 216. Because the plurality of data blocks are numbered, the data mover 206 writes the data block to a location that corresponds with an assigned number. Hence, the another data block may be written to the disk 224 after the data block even through the data block was communicated before the another data block. Moreover, the data block and the another data block may be written to correct locations in the disk 224 using different storage servers.

Figure 3:
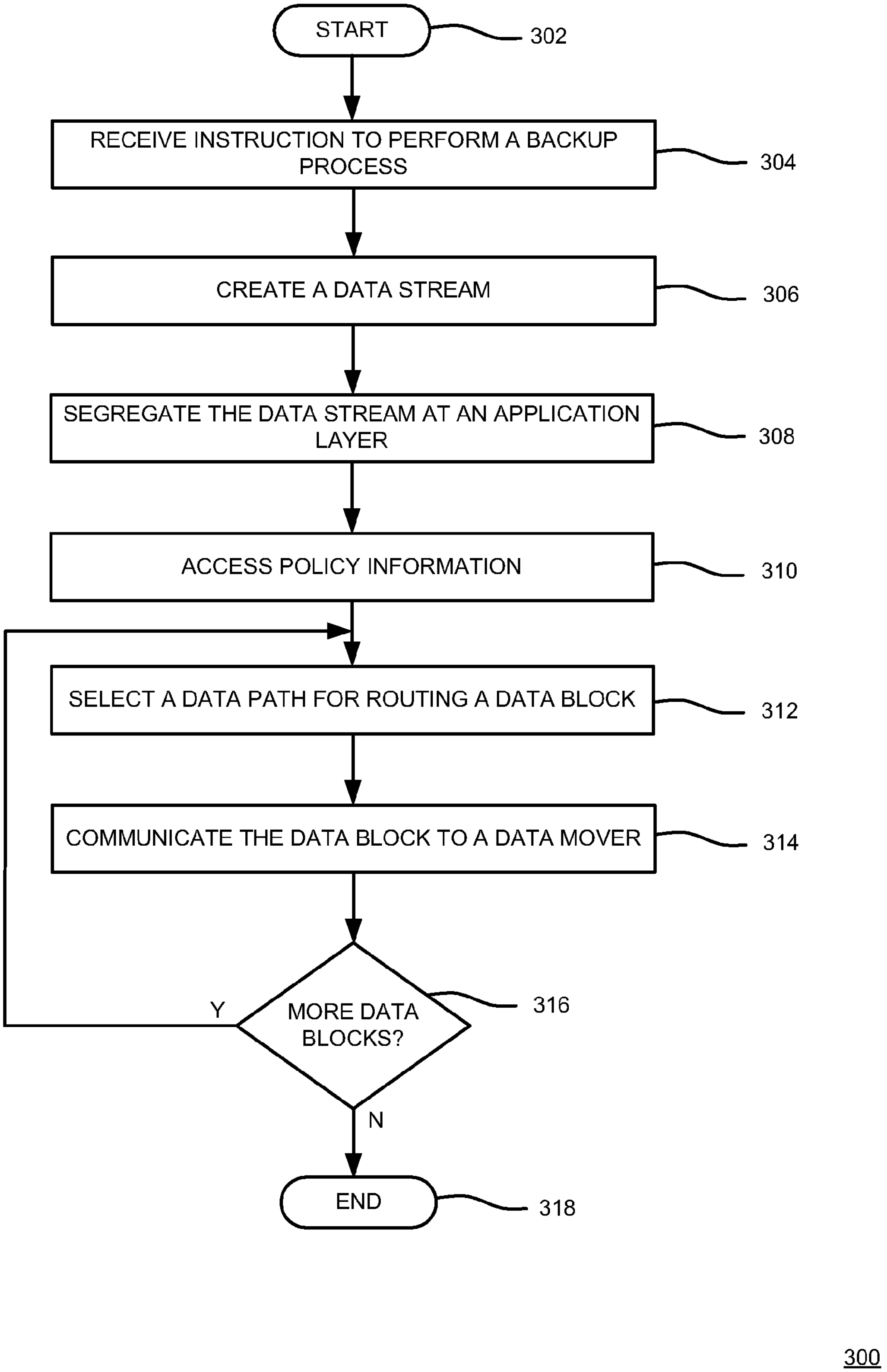
FIG. 3 is a flow diagram of a method for routing a data stream to a destination through a plurality of data movers with indifference to network interface type according to one or more embodiments.

FIG. 3 is a flow diagram of a method 300 for routing a data stream to a destination through a plurality of data movers with indifference to network interface type according to one or more embodiments. The method 300 starts at step 302 and proceeds to step 304, at which an instruction to perform a backup process is received. In one embodiment, a client (e.g., the client 102 of FIG. 1) receives the instruction from a server (e.g., the server 106 of FIG. 1).

At step 306, a data stream (e.g., the data stream 117 of FIG. 1) is created. At step 308, the data stream is segregated at an application layer of a network architecture. In one embodiment, an agent (e.g., the agent 116 of FIG. 1) segregates the data stream into one or more data blocks. At step 310, policy information (e.g., the policy information 124 of FIG. 1) is accessed. At step 312, a data path is selected for routing a data block. At step 314, the data block is communicated to a data mover. At step 316, a determination is made as to whether there are more data blocks to be routed. If it is determined that there are more data blocks to be routed (option "YES"), then the method 300 returns to step 312. If, at step 316 it is determined that there are no more data blocks to be routed (option "NO"), then the method 300 proceeds to step 318, at which the method 300 ends.

Figure 4:
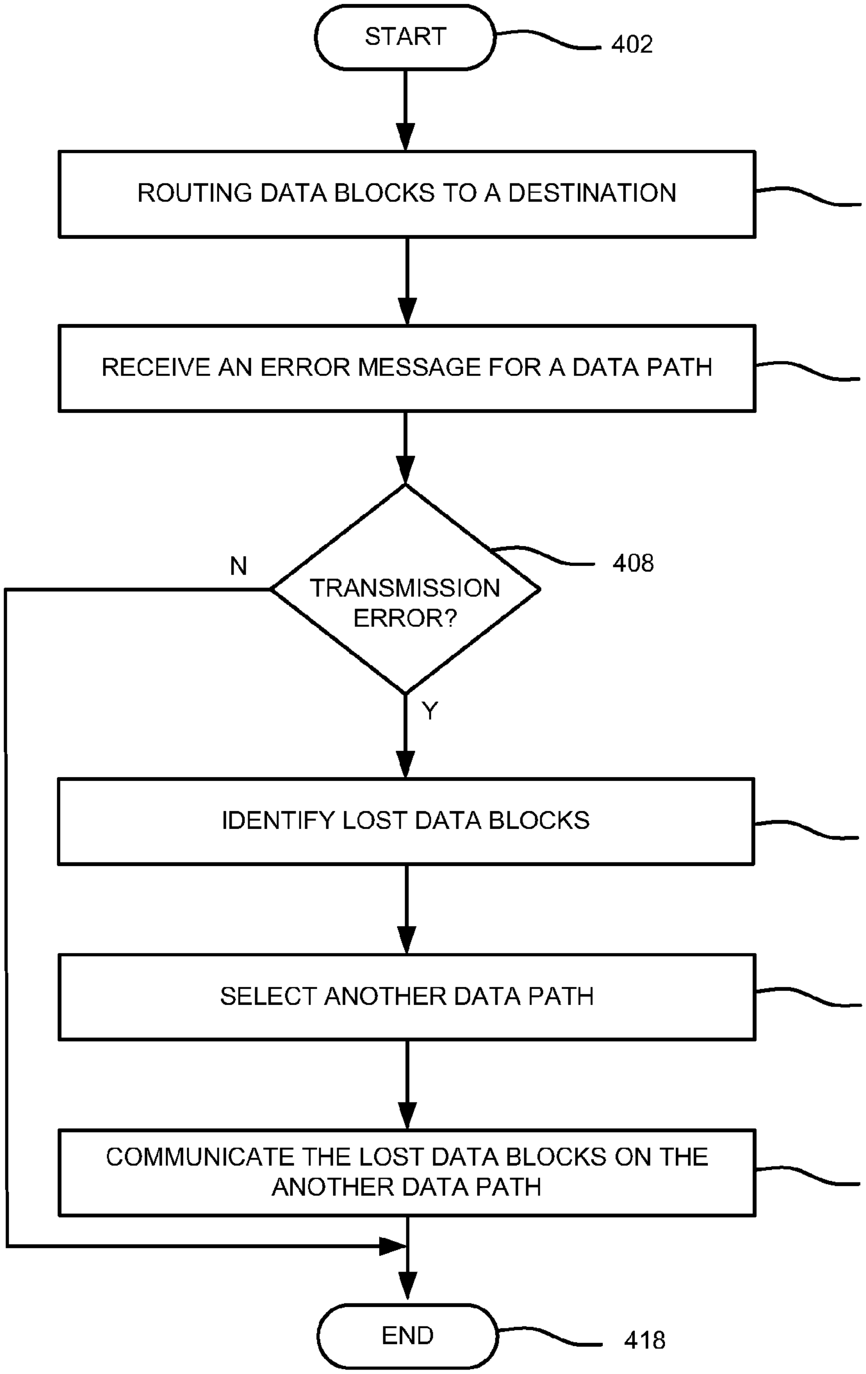
FIG. 4 is a flow diagram of a method for processing an error message associated with a data path according to one or more embodiments.

FIG. 4 is a flow diagram of a method 400 for processing an error message associated with a data path according to one or more embodiments. The method 400 starts at step 402 and proceeds to step 404, at which a plurality of data blocks are routed to a destination (e.g., the destination 128 of FIG. 1). As described herein, the plurality of data blocks form a data stream (e.g., the data stream 117 of FIG. 1)

At step 406, an error message associated with a data path is received. At step 408, a determination is made as to whether the error message indicates that a transmission error occurred while routing the data blocks. If it is determined that the error message indicates a transmission error (option "YES"), then the method 400 proceeds to step 410. If, at step 408 it is determined that the error message does not indicate a transmission error (option "NO"), then the method 400 proceeds to step 416. At step 410, one or more lost data blocks are identified. In one embodiment, an agent (e.g., the agent 116 of FIG. 1) identifies the lost data blocks. At step 412, another data path is selected. At step 414, the lost data blocks are communicated on the another data path. The method 400 proceeds to step 416, at which the method 400 ends.

While the foregoing is directed to embodiments of the present invention, other and further embodiments of the invention may be devised without departing from the basic scope thereof, and the scope thereof is determined by the claims that follow.

The invention claimed is:

1. A method for routing a data stream to a destination through a plurality of data movers with indifference to network interface type, comprising:

segregating the data stream into a plurality of data blocks at an application layer using a computer, wherein
- the plurality of data blocks are to be routed from a client to a destination through the plurality of data movers,
- the plurality of data movers serve as a plurality of parallel interfaces from the client to the destination, and
- the data blocks are configured to be routed using multiple network interface types as a result of the segregating;

assigning a plurality of numbers to the plurality of data blocks, wherein each number of the plurality of numbers corresponds with a position within the data stream of each data block of the plurality of data blocks;

coordinating data path selection for communicating the plurality of data blocks to the plurality of data movers over a plurality of data paths from the client to the destination using the computer; and selecting at least one data path of the plurality of data paths in accordance with policy information, wherein the policy information defines one or more restrictions to data path selection.

2. The method of claim 1, wherein the plurality of data blocks are to be reassembled asynchronously at the destination.

3. The method of claim 1 further comprising identifying at least one data block of the plurality of data blocks that is not present at the destination.

4. The method of claim 3 further comprising resending the identified data block through at another data path of the plurality of data paths.

5. The method of claim 1 wherein the plurality of data blocks are written to the destination at a plurality of locations that correspond with the plurality of numbers.

6. The method of claim 1 further comprising in response to a transmission error associated with a data path of the plurality of data paths, communicating at least one data block of the plurality of data blocks through another data path of the plurality of data paths.

7. An apparatus for routing a data stream to a destination through a plurality of data movers with indifference to network interface type, comprising:

a central processing unit; and a memory storing instructions executable to segregate the data stream into a plurality of data blocks using application-level network services, wherein the plurality of data blocks are to be routed from a client to a destination through a plurality of data movers, the plurality of data movers serve as a plurality of parallel interfaces from the client to the destination, and the data blocks are configured to be routed using multiple network interface types as a result of being segregated, assign a plurality of numbers to the plurality of data blocks, wherein each number of the plurality of numbers corresponds with a position within the data stream of each data block of the plurality of data blocks;

coordinate data path selection for communicating the plurality of data blocks to the plurality of data movers over a plurality of data paths, from the client to the destination, and select at least one data path of the plurality of data paths in accordance with policy information, wherein the policy information defines one or more restrictions to data path selection.

8. The apparatus of claim 7, wherein the instructions are further executable to identify at least one data block of the plurality of data blocks that is not present at the destination.

9. The apparatus of claim 8, wherein the instructions are further executable to resend the identified at least one data block through another data path of the plurality of data paths.

10. The apparatus of claim 7, wherein the plurality of data blocks are configured to be written to the destination at a plurality of locations that correspond with the plurality of numbers.

11. The apparatus of claim 7, wherein the instructions are further executable to process a transmission error associated with a data path of the plurality of data paths and communicates communicate at least one data block of the plurality of data blocks through another data path of the plurality of data paths.

12. A system for routing a data stream to a destination through a plurality of data movers with indifference to network interface type, comprising:

a plurality of data movers executing on one or more computers; and a client coupled with the plurality of data movers, comprising: an agent stored on a memory and executed on a central processing unit for segregating the data stream into a plurality of data blocks at an application layer executing on the client, wherein the plurality of data blocks are to be routed from the client to a destination through the plurality of data movers, the plurality of data movers serve as a plurality of parallel interfaces from the client to the destination, and the data blocks are configured to be routed using multiple network interface types as a result of the segregating, assigning a plurality of numbers to the plurality of data blocks, wherein each number of the plurality of numbers corresponds with a position within the data stream of each data block of the plurality of data blocks;

coordinating data path selection for communicating the plurality of data blocks to the plurality of data movers over a plurality of parallel data paths from the client to the destination, and selecting at least one data path of the plurality of data paths in accordance with policy information, wherein the policy information defines one or more restrictions to data path selection.

13. The system of claim 12, wherein the plurality of data movers is configured to reassemble the plurality of data blocks at the destination asynchronously.

14. The system of claim 12, wherein the plurality of data movers~is configured to write the plurality of data blocks to a plurality of locations that correspond with the plurality of numbers.

15. The system of claim 12, wherein the agent is configured to process a transmission error associated with a data path of the plurality of data paths and communicate at least one data block of the plurality of data blocks through another data path of the plurality of data paths.

* * * * *

UNITED STATES PATENT AND TRADEMARK OFFICE

CERTIFICATE OF CORRECTION

PATENT NO. : 8,161,180 B1
APPLICATION NO. : 12/338116
DATED : April 17, 2012
INVENTOR(S) : Jeremy Dean Swift, Stephan Kurt Gipp and Adonijah Park It is certified that error appears in the above-identified patent and that said Letters Patent is hereby corrected as shown below:

In Claim 4, Column 7, line 14, please insert the words --at least one-- after the word “identified” and before the word “data”.

In Claim 11, Column 8, lines 7 and 8, please delete the word “communi-cates”.

In Claim 14, Column 8, line 45, please delete the symbol “~” after the word “movers” and before the word “is”.

Signed and Sealed this
Twenty-sixth Day of June, 2012

David J. Kappos
*Director of the United States Patent and Trademark Office*

UNITED STATES PATENT AND TRADEMARK OFFICE

CERTIFICATE OF CORRECTION

PATENT NO. : 8,161,180 B1
APPLICATION NO. : 12/338116
DATED : April 17, 2012
INVENTOR(S) : Jeremy Dean Swift, Stephan Kurt Gipp and Adonijah Park It is certified that error appears in the above-identified patent and that said Letters Patent is hereby corrected as shown below:

In Claim 4, Column 7, line 14, please delete the word "at" after the word "through" and before the word "another".

Signed and Sealed this
Twenty-fourth Day of July, 2012

David J. Kappos
*Director of the United States Patent and Trademark Office*